(12) United States Patent
Lee et al.

(10) Patent No.: US 12,057,770 B2
(45) Date of Patent: Aug. 6, 2024

(54) CONTROL DEVICE AND CONTROL METHOD FOR MODULAR MULTILEVEL CONVERTER

(71) Applicant: HYOSUNG HEAVY INDUSTRIES CORPORATION, Seoul (KR)

(72) Inventors: Jun Chol Lee, Gunpo-si (KR); Sung Min Oh, Seoul (KR); Joo Yeon Lee, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 288 days.

(21) Appl. No.: 17/623,417

(22) PCT Filed: Dec. 30, 2020

(86) PCT No.: PCT/KR2020/019410
§ 371 (c)(1),
(2) Date: Dec. 28, 2021

(87) PCT Pub. No.: WO2021/194063
PCT Pub. Date: Sep. 30, 2021

(65) Prior Publication Data
US 2022/0352810 A1 Nov. 3, 2022

(30) Foreign Application Priority Data
Mar. 26, 2020 (KR) .......... 10-2020-0036696

(51) Int. Cl.
*H02M 1/32* (2007.01)
*H02H 7/125* (2006.01)
(Continued)

(52) U.S. Cl.
CPC ......... *H02M 1/325* (2021.05); *H02M 7/4835* (2021.05); *H02H 7/1206* (2013.01);
(Continued)

(58) Field of Classification Search
CPC ...... H02M 1/32; H02M 1/325; H02M 7/4835; H02J 3/36; H02H 7/1206; H02H 7/1222; H02H 7/125; H02H 7/1257
See application file for complete search history.

(56) References Cited

U.S. PATENT DOCUMENTS

| 2014/0002933 A1 | 1/2014 | Gao et al. |
| 2018/0159316 A1* | 6/2018 | Aramaki .................. H02H 3/08 |

(Continued)

FOREIGN PATENT DOCUMENTS

| CN | 102130441 A | * | 7/2011 |
| CN | 102868290 A | * | 1/2013 |

(Continued)

OTHER PUBLICATIONS

Machine translation of CN-102130441-A, Jul. 20, 2011, obtained from https://worldwide.espacenet.com/ on Dec. 7, 2023. ( Year: 2011).*

(Continued)

*Primary Examiner* — Fred E Finch, III
(74) *Attorney, Agent, or Firm* — NKL Law; Jae Youn Kim

(57) ABSTRACT

A control device for an MMC is disclosed. The control device for an MMC including a plurality of converter arms that include a plurality of sub-modules connected in series and that are connected to a DC link includes: an arm controller, which detects the arm current of a converter arm so as to determine whether a DC failure has occurred, and, if it is determined that the DC failure has occurred, transmits a bypass control signal for protecting a sub-module and notifies of the DC failure; a sub-module controller for controlling the sub-module so as to bypass a DC failure current according to the bypass control signal received from the arm controller; and a main controller, which detects, in real-time, the arm current of the converter arm and a voltage (Continued)

(DC link voltage) of the DC link, determines whether the DC failure is a temporary DC failure or a permanent DC failure on the basis of the detected arm current and DC link voltage if the occurrence of the DC failure is notified by the arm controller, and transmits, to the arm controller, a normal operation control signal for normal operation of the sub-module or a bypass control signal for bypassing of the DC failure current.

9 Claims, 7 Drawing Sheets

(51) Int. Cl.
*H02M 7/483* (2007.01)
*H02H 7/12* (2006.01)
*H02J 3/36* (2006.01)
*H02M 1/00* (2006.01)

(52) U.S. Cl.
CPC .............. *H02H 7/1257* (2013.01); *H02J 3/36* (2013.01); *H02M 1/0009* (2021.05)

(56) References Cited

U.S. PATENT DOCUMENTS

| | | | | |
|---|---|---|---|---|
| 2019/0305669 A1* | 10/2019 | Gupta | ................. | G01R 31/085 |
| 2019/0386578 A1* | 12/2019 | Kajiyama | ............. | H02H 7/1216 |
| 2022/0321026 A1* | 10/2022 | Hario | ................. | H02M 1/0009 |

FOREIGN PATENT DOCUMENTS

| | | | |
|---|---|---|---|
| CN | 103078400 A | * | 5/2013 |
| CN | 104600672 A | * | 5/2015 |
| CN | 104659749 B | * | 12/2017 |
| CN | 108599583 A | | 9/2018 |
| KR | 10-2011-0097514 A | | 8/2011 |
| KR | 20110097514 A | | 8/2011 |
| KR | 10-2018-0111333 A | | 10/2018 |
| KR | 10-2019-0065675 A | | 6/2019 |
| KR | 20190065675 A | | 6/2019 |

OTHER PUBLICATIONS

Machine translation of CN-102868290-A, Jan. 9, 2013, obtained from USPTO internal database on Dec. 7, 2023. (Year: 2013).*
Machine translation of CN-103078400-A, May 1, 2013, obtained from https://worldwide.espacenet.com/ on Dec. 7, 2023. ( Year: 2013).*
Machine translation of CN-104600672-A, May 6, 2015, obtained from USPTO internal database on Dec. 7, 2023. (Year: 2015).*
Machine translation of CN-104659749-B, Dec. 22, 2017, obtained from https://worldwide.espacenet.com/ on Dec. 7, 2023. (Year: 2017).*
Kang, Hyo-Jin et al., "Control and Protection Test of Mmc Hvdc System using Hardware-in-Loop Simulation", Proceedings of KIEE's 70th Founding Anniversary Summer Conference, 2017, pp. 225-226.

* cited by examiner

CONTROL DEVICE AND CONTROL METHOD FOR MODULAR MULTILEVEL CONVERTER

TECHNICAL FIELD

The present disclosure relates to a Modular Multilevel Converter (MMC) and, particularly, to a control device and a control method for an MMC which can accurately sense a DC failure of an MMC and quickly take a measure for protection.

BACKGROUND ART

A High Voltage Direct Current (HVDC) power system converts AC power into DC power and transmits the DC power using an AC/DC converter at a power transmission terminal and supplies AC power at a power reception terminal using a DC/AC converter.

Such an HVDC power transmission type can efficiently and economically transmit power by increasing the voltage and has advantages of different system connection, high-efficiency long-distance power transmission, etc.

An MMC may be connected to an HVDC system. An MMC is a converter in which a converter arm is configured by connecting several sub-modules (SM) in series.

Such an MMC can achieve high-voltage and high-capacity voltage output, which a multiple converter has, and can adjust an output voltage through step-type output.

However, many measures for an AC failure have been proposed for an MMC, but there is almost no measure for a DC failure. Since a short circuit that occurs at a DC link in an MMC has a bad influence on the system connected with the MMC, it is required to protect the system by stopping the converter and opening a main breaker as quick as possible.

In the related art, a DC failure in an MMC is sensed by checking whether there is an overcurrent by measuring an arm current flowing through a converter arm. However, it is required to measure all of six arm currents, so there is a problem that quick sensing is difficult.

A method of sensing a DC failure in an MMC on the basis of an arm current has been disclosed in Korean Patent No. 10-1882908. However, this patent has a problem of low reliability because a DC failure is determined by sensing an overcurrent by measuring only an arm current.

There is another problem that the operation for protecting the MMC is late because the method takes measures against a DC failure by measuring the arm current of all converters.

Accordingly, there is a need for a control method for sensing a DC failure and protecting an MMC to overcome the limitation of the technology of sensing a DC failure in an MMC in the related art.

DISCLOSURE

Technical Problem

An objective of the present disclosure is to provide a control device and a control method for an MMC which more quickly senses a DC failure in an MMC.

Another objective of the present disclosure is to provide a control device and a control method for an MMC which increase reliability of sensing a DC failure by simultaneously checking an arm current and a DC link voltage in an MMC.

Another objective of the present disclosure is to provide a control device and a control method for an MMC which can quickly take measures against a DC failure by enabling not only a main controller, but an arm controller to measure an arm current, and enables the arm controller also to control the operation of a sub-module in an MMC.

Another objective of the present disclosure is to provide a control device and a control method for an MMC which can flexibly operate an MMC by returning a sub-module into the normal operation state when an instantaneous DC failure occurs at which an overcurrent is not generated in the arm currents of all converter arms in the MMC.

Technical Solution

A control device for an MMC composed of a plurality of sub-modules connected in series and including a plurality of converter arms connected to a DC link according to an embodiment of the present disclosure includes: an arm controller configured to determine whether a DC failure occurs by detecting an arm current of the converter arm, and configured to transmit a bypass control signal for protecting a sub-module and give notification of the DC failure when determining that the DC failure occurs; a sub-module controller configured to control the sub-module to bypass a DC failure current in response to the bypass control signal received from the arm controller; and a main controller configured to detect in real time an arm current of the converter arm and a voltage of the DC link (a DC link voltage), determine whether the DC failure is a temporal DC failure or a permanent DC failure on the basis of the detected arm current and DC link voltage when being notified of occurrence of the DC failure by the arm controller, and transmit a normal operation control signal for normally operating the sub-module or a bypass control signal for bypassing the DC failure current to the arm controller.

In this embodiment, the sub-module may include: a half bridge or full bridge circuit including a plurality of power switches and a capacitor connected to the power switches in series; and a bypass switch connected between I/O terminals of the half bridge or full bridge circuit and configured to bypass a current.

In this embodiment, the sub-module controller may turn off the power switches and turn on the bypass switch in response to the bypass control signal received from the arm controller.

In this embodiment, the main controller may transmit a normal operation control signal for normally operating the sub-module to the arm controller when the DC failure is a temporal DC failure and a normal state is returned.

In this embodiment, the arm controller may transmit the normal operation control signal to the sub-module controller and the sub-module controller may control the sub-module to normally operate in response to the normal operation control signal.

In this embodiment, the sub-module controller may turn on the power switches, which have been turned off, and may turn off the bypass switch, which has been turned on, in response to the normal operation control signal.

In this embodiment, the main controller may transmit a bypass signal for bypassing the DC failure current to the arm controller when the DC failure is a permanent DC failure.

In this embodiment, the arm controller may transmit the bypass control signal to the sub-module controller and the sub-module controller may control the sub-module to bypass the DC failure current in response to the bypass control signal.

In this embodiment, the sub-module controller may keep the power switches, which have been turned off, turned off and may keep the bypass switch, which has been turned on, turned on in response to the bypass control signal.

In this embodiment, the arm controller may transmit a bypass control signal for turning off the power switches and turning on the bypass switch to the sub-module controller without receiving a control signal from the main controller when determining occurrence of the DC failure on the basis of the detected arm current.

In this embodiment, the arm controller may determine that the DC failure occurs when the detected arm current is higher than a predetermined current.

A control method for an MMC composed of a plurality of sub-modules connected in series and including a plurality of converter arms connected to a DC link according to an embodiment of the present disclosure includes: determining whether a DC failure occurs by detecting an arm current of the converter arm by means of a converter controller; transmitting a bypass control signal to a sub-module controller and notifying a main controller of occurrence of a DC failure when determining that a DC failure occurs; controlling the sub-module to bypass a DC failure current in response to the bypass control signal by means of the sub-module controller; detecting in real time an arm current of the converter arm and a voltage of the DC link (a DC link voltage) and determining whether the DC failure is a temporal DC failure or a permanent DC failure on the basis of the detected arm current and DC link voltage by means of the main controller when the main controller is notified of occurrence of the DC failure; transmitting a normal operation control signal for normal operation of the sub-module or a bypass control signal for bypassing of the DC failure current to the arm controller by means of the main controller, depending on whether the DC failure is a permanent DC failure or a permanent DC failure.

In this embodiment, the main controller may transmit a normal operation control signal for normally operating the sub-module to the arm controller when the DC failure is a temporal DC failure.

In this embodiment, the arm controller may transmit the normal operation control signal to the sub-module controller and the sub-module controller may control the sub-module to normally operate in response to the normal operation control signal.

In this embodiment, the sub-module controller may turn on a plurality of power switches in the sub-module and may turn off a bypass switch for bypassing the DC failure current in response to the normal control signal.

In this embodiment, the main controller may transmit a bypass signal for bypassing the DC failure current to the arm controller when the DC failure is a permanent DC failure.

In this embodiment, the arm controller may transmit the bypass control signal to the sub-module controller and the sub-module controller may control the sub-module to bypass the DC failure current in response to the bypass control signal.

In this embodiment, the sub-module controller may turn off a plurality of power switches in the sub-module and may turn on a bypass switch for bypassing the DC failure current in response to the bypass control signal.

In this embodiment, the controlling of operation of the sub-module may turn off a plurality of power switches in the sub-module and turn on a bypass switch for bypassing the DC failure current by means of the sub-module controller.

Advantageous Effects

According to the present disclosure, it is possible to more quickly sense a DC failure by monitoring not only an arm current of a converter arm, but a DC link voltage in an MMC.

According to the present disclosure, it is possible to increase reliability of sensing of a DC failure because of simultaneously monitoring an arm current and a DC link voltage in an MMC.

According to the present disclosure, it is possible to quickly take measures against a DC failure because not only the main controller, but the arm controller can measure an arm current and the arm current can also control the operation of the sub-module.

According to the present disclosure, it is possible to flexibly operate an MMC by returning the sub-module to normally operate when it is a temporal DC failure in which an overcurrent is not generated in the arm current of all converter arms in an MMC.

MODE FOR INVENTION

Figure 1:
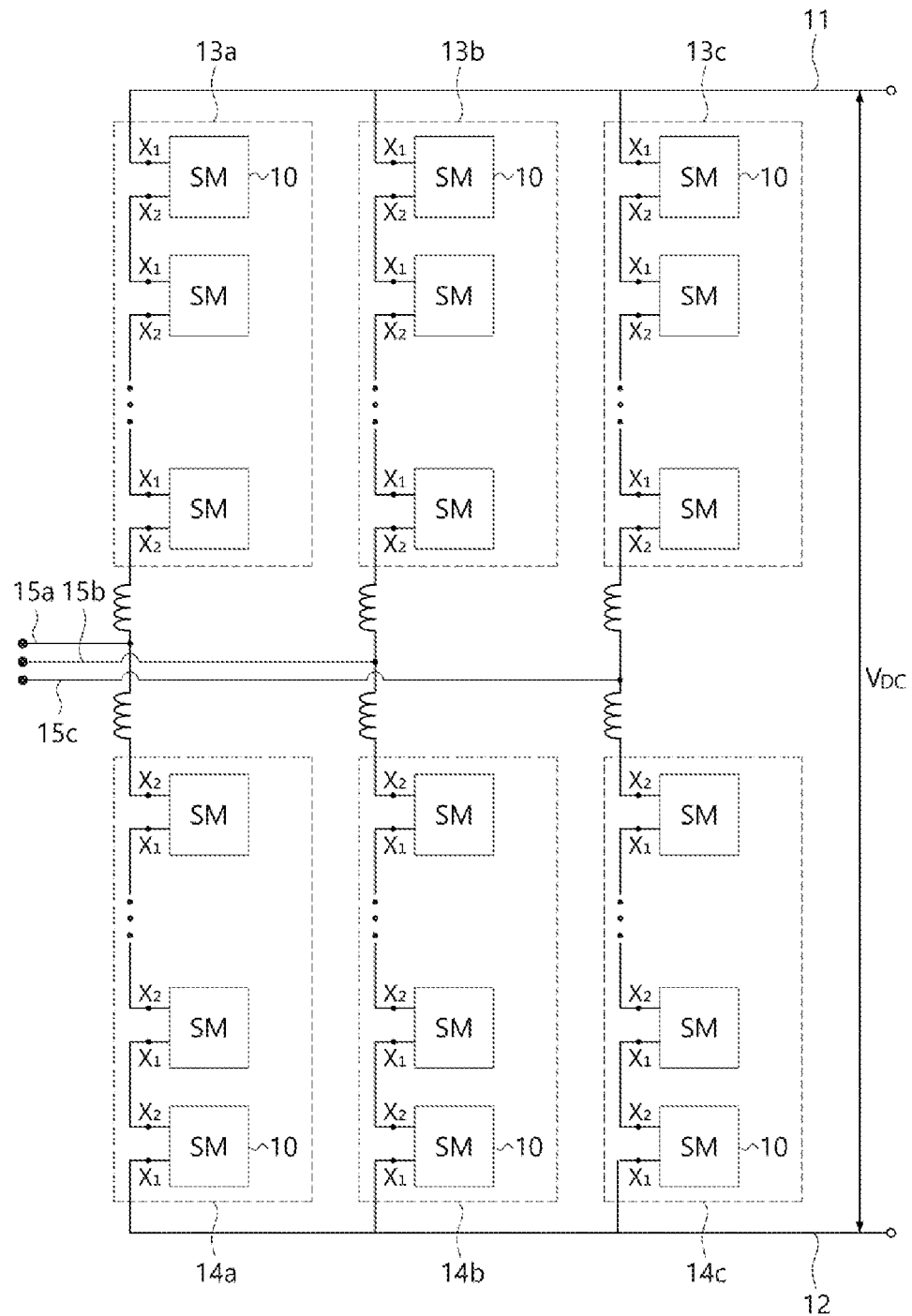
FIG. 1 is a diagram schematically showing the configuration of an MMC according to an embodiment of the present disclosure.

Hereinafter, some embodiments of the present disclosure are described in detail with exemplary drawings. It should be noted that when components are given reference numerals in the drawings, the same components are given the same reference numerals even if they are shown in different drawings. In the following description of embodiments of the present invention, when detailed description of well-known configurations or functions is determined as interfering with understanding of the embodiments of the present invention, they are not described in detail.

Further, terms 'first', 'second', 'A', 'B', '(a)', and '(b)' can be used in the following description of the components of embodiments of the present invention. These terms are provided only for discriminating components from other components and, the essence, sequence, or order of the components are not limited by the terms. When a component is described as being "connected", "combined", or "coupled" with another component, it should be understood that the component may be connected or coupled to another component directly or with another component interposing therebetween.

FIG. 1 is a diagram showing the configuration of an MMC according to an embodiment of the present disclosure.

Referring to FIG. 1, in a Modular Multilevel Converter (MMC) 1 according to an embodiment of the present disclosure, a plurality of converter arms 13a, 13b, 13c, 14a, 14b, and 14c may be connected to DC links connected to a DC system, and a plurality of sub-modules SM 10 may be connected in series to each of the arms.

The arms may be composed of upper arms 13a, 13b, and 13 and lower arms 14a, 14b, and 14c. A plurality of legs 15a, 15b, and 15c at the middle points between the upper arms and the lower arms and the MMC 1 may be connected with an AC system through the legs 15a, 15b, and 15c.

A DC link voltage may be input to or output from the DC links 11 and 12 and a DC voltage Vdc, which is a Pole-to-Pole voltage, may be input or output between the two DC links 11 and 12.

The MMC 1 can convert a DC link voltage input from the DC system through the DC links 11 and 12 into an AC voltage and transmit the AC voltage to the AC system through the legs 15a, 15b, and 15c.

The MMC converter 1 can convert an AC voltage input from the AC system through the legs 15a, 15b, and 15c into a DC voltage and transmit the DC voltage to the DC system through the DC links 11 and 12.

Figure 2:
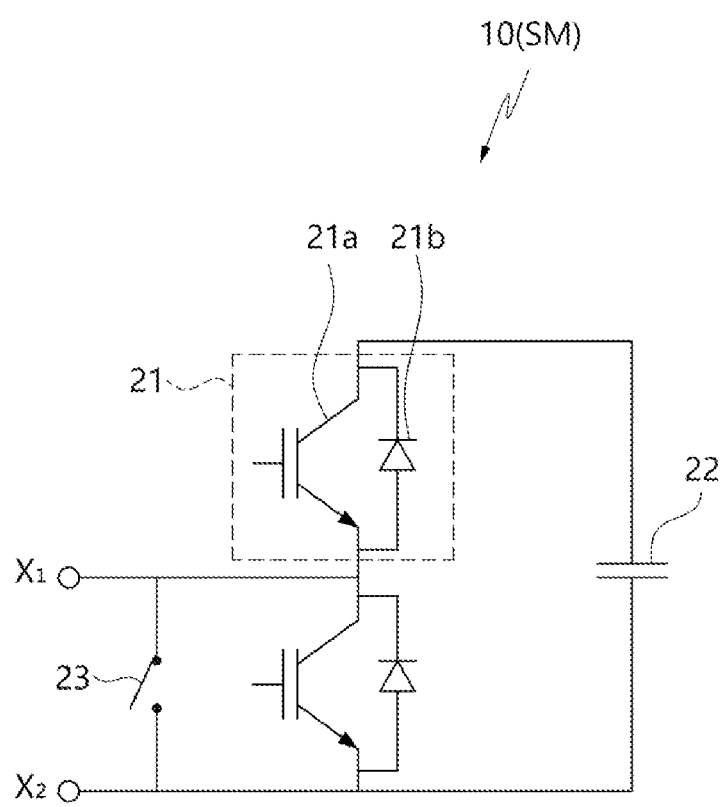
FIG. 2 is an embodiment of a sub-module constituting the MMC.
Figure 3:
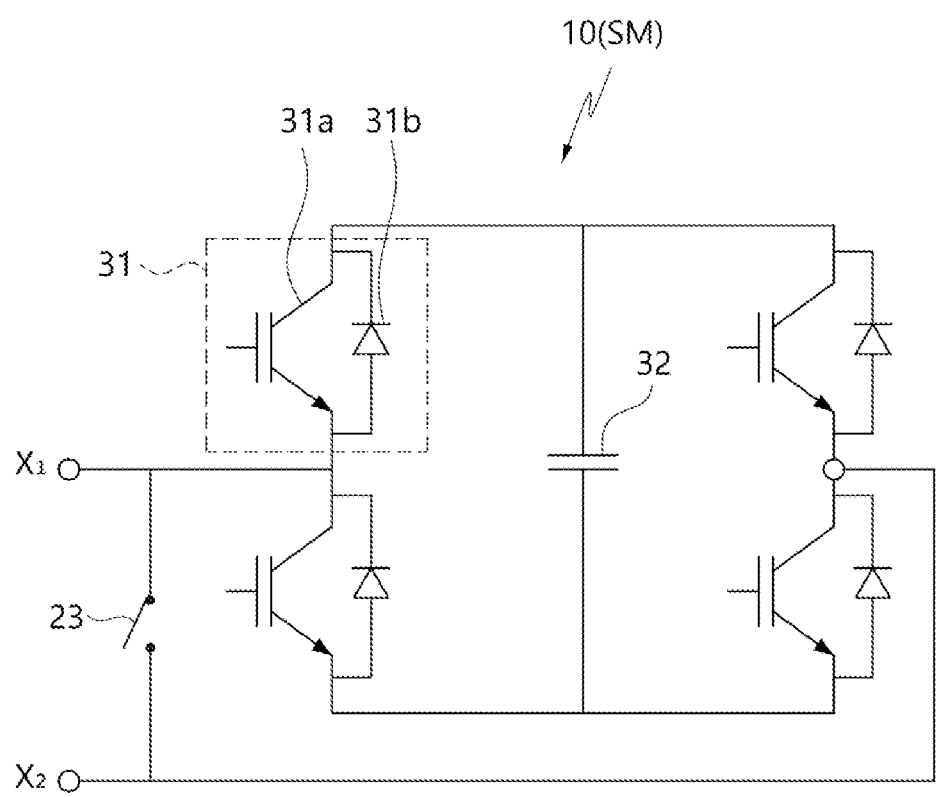
FIG. 3 is another embodiment of a sub-module constituting the MMC.

FIG. 2 shows an example of a sub-module 10 constituting a converter arm of the MMC 1 and FIG. 3 shows another embodiment of the sub-module 10.

Referring to FIG. 2, in an embodiment of the present disclosure, each sub-module (SM) 10 may include a half bridge circuit including a pair of power switches 21 and a capacitor connected in parallel to the power switches 21. The power switches 21 each may include a power semiconductor switch 21a and a diode 21b connected in anti-parallel to the power semiconductor switch 21a.

Referring to FIG. 3, in another embodiment of the present disclosure, each sub-module (SM) may include a so-called full bridge switch including two pairs of power switches 31 connected in parallel to each other, and a capacitor 32 connected in parallel to the power switches 31. The power switches 31 each may include a power semiconductor switch 31a and a diode 31b connected in anti-parallel to the power semiconductor switch 31a. The power switches 31 each may include a power semiconductor switch 31a and a diode 31b connected in anti-parallel to the power semiconductor switch 31a.

In FIGS. 2 and 3, the power switches 21 and 31 of the sub-module 10, for example, may be IGBTs and may be turned on/turned off by a sub-module controller 43 to be described below. The sub-module 10 is an important component in the MMC 1 and conversion of AC-DC voltages may be made in the MMC by turning on/turning off of the power switches 21 and 31.

Two I/O terminals X1 and X2 may be formed at the sub-module 10 and the sub-module 10 may be connected with another sub-module in series through the I/O terminals X1 and X2. The uppermost and lowermost sub-modules 10 may be connected to the DC links 11 and 12, respectively.

Bypass switches 22 and 23 may be connected between the I/O terminals X1 and X2. The bypass switches 23 and 33 can form a path for bypassing a DC failure current to protect the sub-module 10 from a DC failure current when a DC failure occurs.

In detail, when the sub-module 10 is normally operated, the bypass switches 23 and 33 are turned off, so a current flows to the power switches 21 and 31 and the capacitors 22 and 32 of the sub-module 10 and does not flow to the bypass switches 23 and 33.

When a DC failure occurs, the bypass switches 23 and 33 can be turned on. When the bypass switches 23 and 33 are turned on, a DC failure current can be bypassed through the bypass switches 23 and 33. In this case, the power switches 21 and 31 of the sub-module 10 are turned off and inflow of the DC failure current can be blocked.

That is, the bypass switches 23 and 33 are turned on, so the DC failure current can be bypassed through the bypass switches 24 and 34 that are a detours rather than the power switches 21 and 31 of the sub-module 10. Accordingly, the power switches 21 and 31 of the sub-module 10 can be protected from the DC failure current.

In this embodiment, the bypass switches 23 and 33, for example, may be thyristors, mechanical switches, power semiconductor switches, or the like, and turning on/turning off the bypass switches 23 and 33 may be controlled by a sub-module controller 43.

Figure 4:
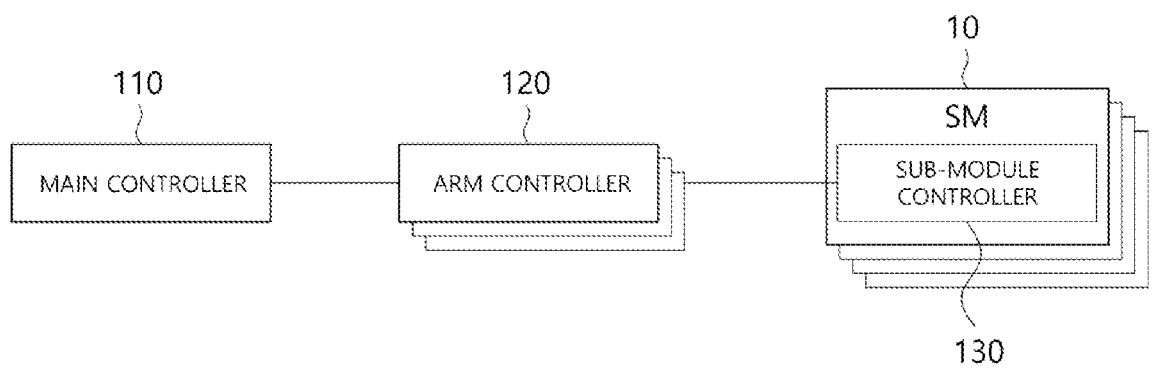
FIG. 4 is a diagram showing the configuration of controllers in an MMC according to an embodiment of the present disclosure.

FIG. 4 is a diagram showing the configuration of controllers in an MMC according to an embodiment of the present disclosure.

Referring to FIG. 4, an embodiment of the present disclosure may include a main controller 110, a plurality of arm controllers 120, and a plurality of sub-module controllers 130 as controllers for controlling the MMC 1.

The sub-module controller 130 may be installed in each of the sub-modules 10 and can generally control the operation of the corresponding sub-module 10. In particular, the sub-module controller 130 can control tuning-on/turning-off of the power switches 21 and 31 and turning-on/turning-off of the bypass switches 23 and 33 of the sub-module 10.

The arm controllers 120 may be separately installed at the converter arms 13a, 13b, 13c, 14a, 14b, and 14c, respectively. For example, a total of six arm controllers 120 may be installed to correspond to the upper arms 13a, 13b, and 13c and the lower arms 14a, 14b, and 14c, respectively.

The arm controllers 120 can control a plurality of sub-module controllers 130 constituting the upper arms 13a, 13b, and 13c and the lower arms 14a, 14b, and 14c.

The arm controller 120 can receive a control signal and data from an upper main controller 110 and transmit them to a lower sub-module controller 130 and can transmit a state signal and data from the sub-module controller 130 to the main controller 110.

The main controller 110 can generally control the operation of the MMC 1. The main controller 110 can also control the operation of an HVDC system (not shown) connected with the MMC 1.

The main controller 110 may control a plurality of arm controllers 120 and each arm controller 120 may control a plurality of sub-module controllers 130. That is, the main controller 110 can transmit a control signal to the arm controller 120 and the arm controller 120 can transmit a control signal to the sub-module controller 130 in response to the transmitted control signal.

Figure 5:
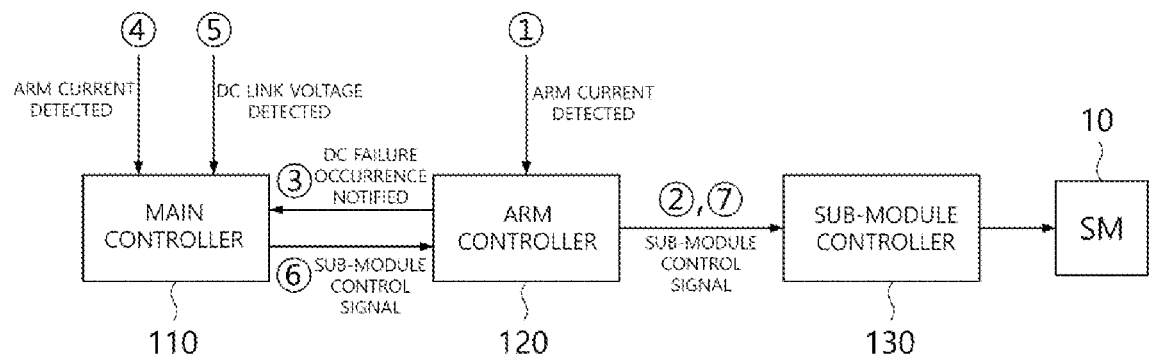
FIG. 5 is a diagram showing the configuration of a control device for an MMC of an MMC according to an embodiment of the present disclosure.

FIG. 5 is a diagram showing the configuration of a control device for an MMC according to an embodiment of the present disclosure.

Referring to FIG. 5, a control device 100 for an MMC according to an embodiment of the present disclosure may include a main controller 110, a plurality of arm controllers 120, and a plurality of sub-module controllers 130.

The main controller 110 can detect a DC link voltage applied to the DC links 11 and 12 and can detect arm currents flowing through a plurality of converter arms 13a, 13b, 13c, 14a, 14b, and 14c.

To this end, the main controller 110 may include a voltage detector (not shown) that can detect a DC link voltage and a current detector (not shown) that can detect an arm current flowing through a converter arm.

The main controller 110 can transmit a control signal for the operation of the sub-modules 10 to the arm controllers 120 using the detected DC link voltages and arm currents. In this case, the control signal, for example, may be a tuning-on/turning-off signal for the power switches 21 and 31 and an turning-on/turning-off signal for the bypass switches 23 and 33 of the sub-module 10.

The arm controllers 120 can detect the arm currents flowing through the converter arms 13a, 13b, 13c, 14a, 14b, and 14c, respectively. To this end, the arm controller 120 may include a current detector (not shown) that can detect an arm current.

The arm controllers 120 can transmit a control signal for the operation of the sub-modules 10 to the sub-module controllers 130 on the basis of the detected arm currents. The control signal, for example, may be a tuning-on/turning-off signal for the power switches 21 and 31 and a turning-on/turning-off signal for the bypass switches 23 and 33 of the sub-module 10.

The arm controller 120 can transmit a control signal to the sub-module controller 130 when receiving a control signal for the operation of the sub-module 10 from the main controller 110.

When receiving a control signal for the sub-module 10 from the arm controller 120, the sub-module controller 130 can control the operation of the sub-module in response to the control signal. For example, it is possible to turn on/turn off the power switches 21 and 31 or turn on/turn off the bypass switches 23 and 33 of the sub-module 10 in response to the control signal.

Figure 6:
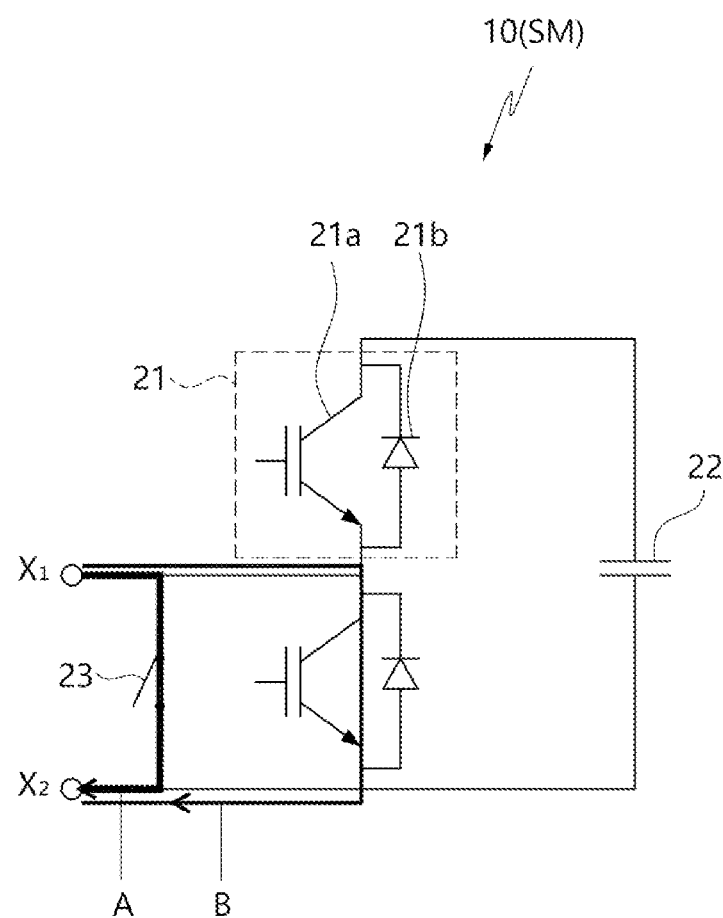
FIG. 6 is an exemplary diagram showing current flow in a sub-module according to the operation of the control device for an MMC.
Figure 7:
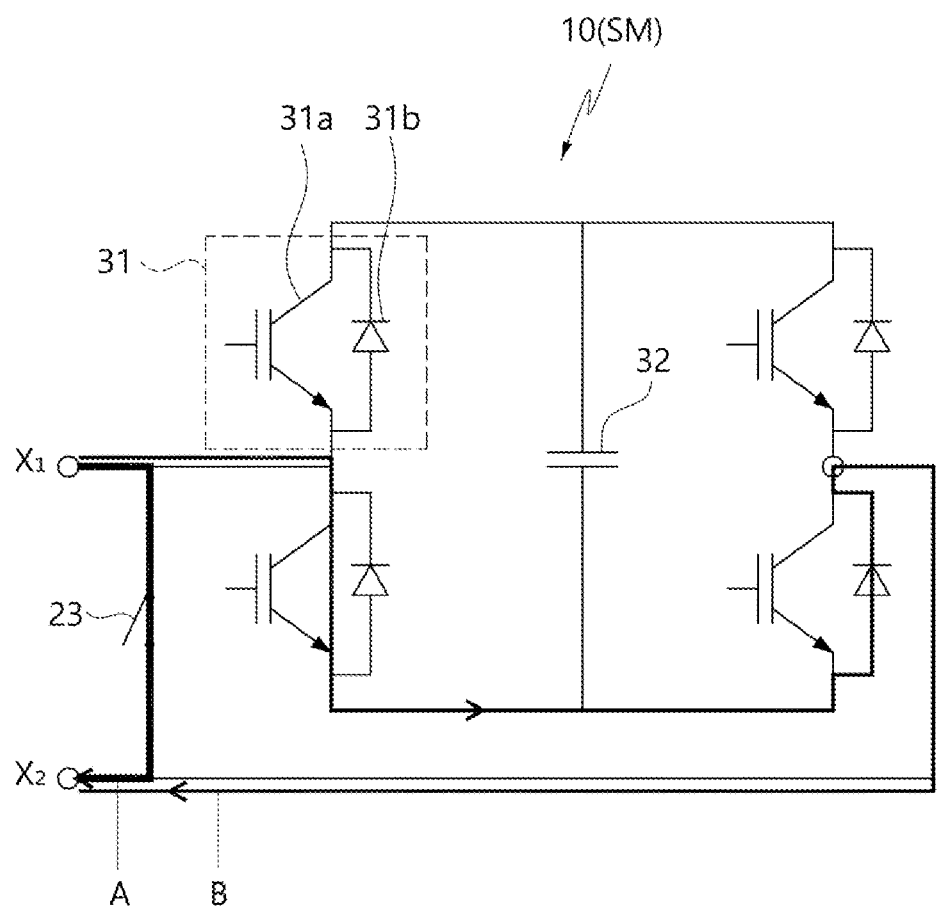
FIG. 7 is another exemplary diagram showing current flow in a sub-module according to the operation of the control device for an MMC.

FIG. 6 is an exemplary diagram showing current flow in a sub-module according to the operation of the control device for an MMC and FIG. 7 is another exemplary diagram showing current flow in a sub-module according to the operation of the control device for an MMC.

Hereafter, the operation of the control device 100 for an MMC 1 according to an embodiment of the present disclosure is described in detail with reference to FIGS. 5 to 7.

The arm controller 120, in real time, can detect the arm current flowing through the converter arm, which it controls, and determine whether the detected arm current is a DC failure current.

For example, when a DC failure occurs in the MMC 1, a DC failure current may flow to converter arms. In this case, the arm controllers 120, in real time, can detect the arm current and determine whether the arm current is higher than a predetermined current.

There may be several factors that cause an overcurrent in the MMC 1. In this embodiment, an example in which when a DC failure occurs, a DC failure current flows to a converter arm, so an overcurrent is generated in the arm current is described.

When determining that an arm current due to a DC failure is a DC failure current that is higher than a predetermined current, the arm controller 120 can transmit a bypass control signal for the sub-module 10 to the sub-module controller 130 to protect the sub-module 10 from the DC failure current.

In detail, the bypass signal for the sub-module 10 may be a signal for turning off the power switches 21 and 31 and turning on the bypass switches 23 and 33 of the sub-module 10.

The sub-module controller 130 can turn off the power switches 21 and 31 and turn on the bypass switches 23 and 33 of the sub-module 10 in response to the bypass control signal.

Accordingly, the DC failure current does not flow into the sub-module 10 and is bypassed through the bypass switch 23 and 33, whereby the sub-module 10 can be protected.

When a DC failure current due to a DC failure is detected, the arm controller 120 can notify the main controller 110 of generation of the DC failure current. This notification may be notification about occurrence of a DC failure or generation of an overcurrent. In this embodiment, the notification may include a flag showing occurrence of a DC failure.

The main controller 110 can detected in real time an arm current flowing through the converter arm and the voltage of the DC link, that is, a DC link voltage. When a DC failure occurs, a DC failure current higher than a predetermined current may flow to the arm current of the converter arm and a DC link voltage lower than a predetermined voltage may be applied to the DC link. The main controller 110 can determine whether a DC failure occurs in the MMC 1 on the basis of the detected arm current and DC link voltage.

In this embodiment, when receiving notification of a DC failure from the arm controller 120, the main controller can determine whether the DC failure is a temporal DC failure or a permanent DC failure on the basis of the arm current and DC link voltage that are detected in real time.

For example, when a temporal DC failure occurs in the MMC 1, the arm current may temporarily increase for short time and then may return to the normal state and the DC link voltage may temporarily decrease for short time and then may return to the normal state.

However, when a permanent DC failure occurs, the arm current may be maintained higher than the predetermined value and the DC link voltage may be maintained lower than the predetermined voltage.

In this embodiment, the temporal DC failure means that a DC failure temporarily occurs for short time and then the DC link voltage and the arm current are immediately returned to the normal states.

The main controller 110 can transmit different control signals for operation of the power switches 21 and 31 and the bypass switches 23 and 33 of the sub-module 10 to the arm controller 120, depending on whether a DC failure is temporal or permanent.

That is, when determining that a DC failure is a temporal DC failure and the arm current and DC link voltage have returned to the normal levels, the main controller 110 can transmit a normal operation control signal for normally operating again the sub-module 10 to the arm controller 120.

In detail, the main controller 110 can transmit a normal operation signal for turning on the power switches 21 and 31 of the sub-module 10 and turning off the bypass switches 23 and 33 to the arm controller 120.

This is for turning on the power switches 21 and 31 that have been turned off and turning off the bypass switches 23 and 33 that have been turned on when a DC failure is temporal and the DC link voltage and arm current are returned to the normal states.

Accordingly, the arm controller 120 can transmit the normal operation control signal tot eh sub-module controller 130 and the sub-module controller 130 can turn on the power switches 21 and 31 of the sub-module 10 and turn off the bypass switches 23 and 33 in response to the normal operation control signal. Therefore, a normal state current can flow to the power switches 21 and 31 and the capacitors 22 and 33 of the sub-module 10.

When determining that a DC failure is a permanent DC failure and the arm current and DC link voltage are not returned to the normal levels, the main controller can stop the operation of the sub-module 10 and transmit a bypass control signal for bypassing the DC failure current to the arm controller 120.

In detail, the main controller 110 can transmit a bypass signal for keeping the power switches 21 and 31 of the sub-module 10 off and keeping the bypass switches 23 and 33 on to the arm controller 120.

This is for keeping the power switches 21 and 32, which are in the turn-off state, off and keeping the bypass switches 23 and 33, which are in the turn-on state, on to keep protecting the sub-module 10 from the DC failure current because the DC failure is permanent. Accordingly, the DC failure current keeps bypassed, so it is possible to keep protecting the sub-module 10 from the DC failure current.

In FIGS. 6 and 7, the thin solid line B indicates an example of the state in which a normal state current flows through the power switches 21 and 31 and the thick solid line A indicates an example of the state in which a DC failure current is bypassed through the bypass switches 23 and 33.

It can be seen that a current flows through the power switches 21 and 31 in the normal state, but a DC failure current is bypassed through the bypass switches 23 and 33 when a DC failure occurs.

Figure 8:
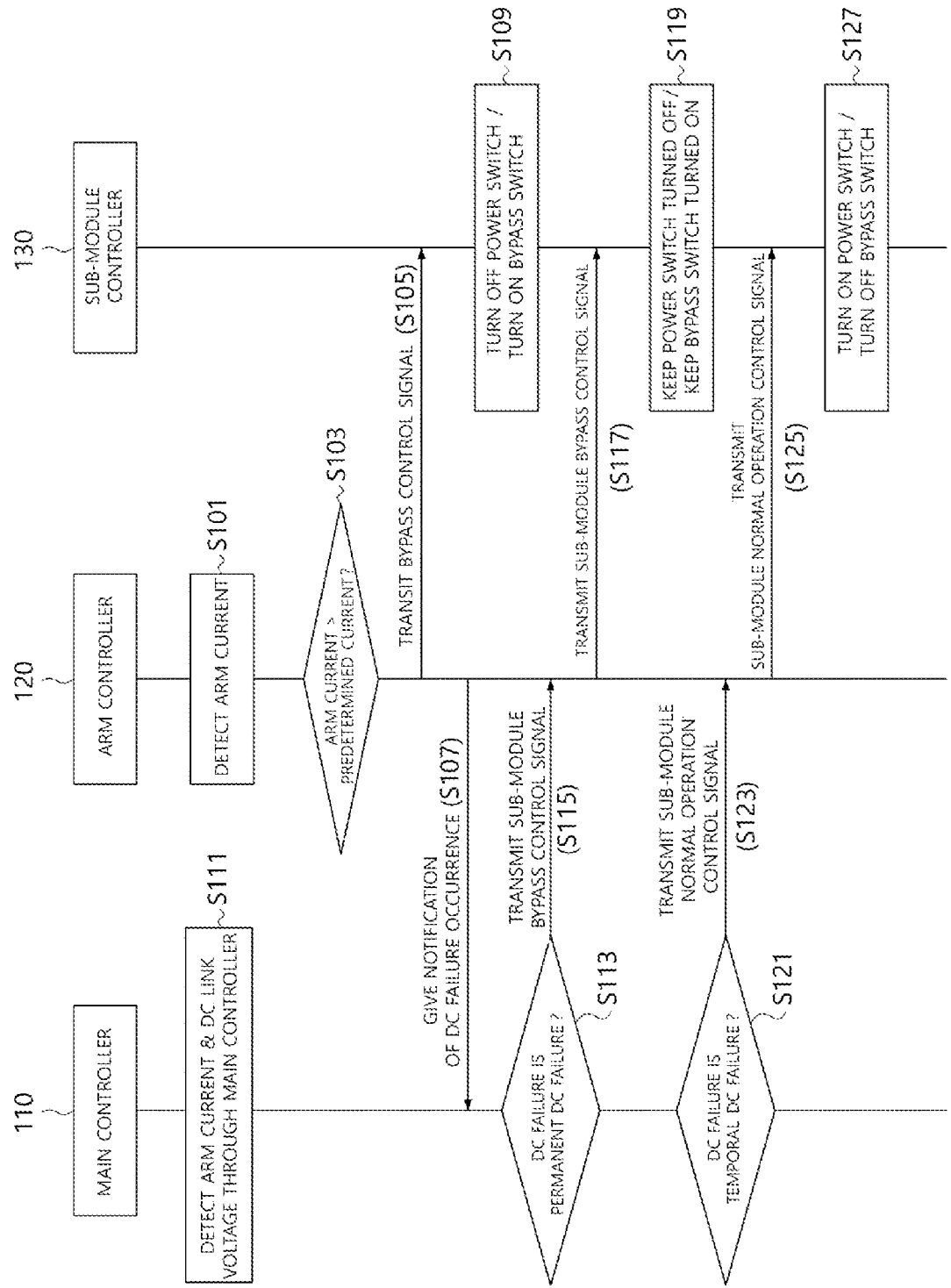
FIG. 8 is a flowchart showing a control method for an MMC according to an embodiment of the present disclosure.

FIG. 8 is a flowchart showing a control method for an MMC according to an embodiment of the present disclosure.

Referring to FIG. 8, according to a control method for an MMC according to an embodiment of the present disclosure, the arm controllers 120 detect in real time the arm currents flowing through a plurality of converter arms constituting the MMC 1 (S101).

In this embodiment, the converter arms may be composed of three upper arms 13a, 13b, and 13c and three lower arms 14a, 14b, and 14c and a plurality of arm controllers 120 may be provided for the converter arms, respectively. Each of the arm controllers 120 detects in real time the arm current flowing through its corresponding converter arm.

Next, the arm controller 120 determines that the detected arm current is higher and a predetermined current (S103). For example, in this embodiment, whether a detected arm current is a DC failure current due to a DC failure occurring the MMC 1 is determined.

When determining that the arm current is a DC failure current, the arm controller 120 transmits a bypass control signal for detecting the sub-module 10 from the DC failure current to the sub-module 130 (S105) and notifies the main controller 110 of generation of the DC failure current (S107). This notification may be notification about occurrence of the DC failure.

The bypass control signal may be a signal for turning of the power switches 21 and 31 of the sub-module 10 and turning on the bypass switches 23 and 33. This is for bypassing the DC failure current through the bypass switches 23 and 33.

Accordingly, the sub-module controller 130 can turn off the power switches 21 and 31 and turn on the bypass switches 23 and 33 of the sub-module 10 (S109).

Therefore, an overcurrent due to the DC failure is bypassed through the bypass switches 23 and 33, whereby it is possible to protect the sub-module 10.

The main controller 110 can detected in real time an arm current flowing through the converter arm and the voltage of the DC link, that is, a DC link voltage (S111).

When notified of generation of a DC failure current from the arm controller 120 in S107, the main controller 110 determines whether the current DC failure is a temporal DC failure or a permanent DC failure on the basis of the real-time detected arm current and DC link voltage.

When it is determined that the DC failure is a permanent DC failure (S113), a control signal for keeping the power switches 21 and 31, which are currently in the turn-off state, off and keeping the bypass switches 23 and 33, which are current in the turn-on state, on is transmitted to the arm controller (S115).

Then, the arm controller 120 transmits the bypass control signal to the sub-module controller 130 (S117).

The sub-module controller 130 keeps the power switches 21 and 31 off and the bypass switches 23 and 33 on in response to the bypass control signal (S119). This is for keeping the DC failure current being bypassed through the bypass switches 23 and 33.

On the contrary, when it is determined that the DC failure is a temporal DC failure and the normal states is returned (S121), a normal operation control signal for turning on the power switches 21 and 31 that are current in the turn-off state and turning off the bypass switches 23 and 33 that are currently in the on state is transmitted to the arm controller 120 (S123).

The normal operation control signal is for normally operating the sub-module 10 by turning on the power switches 21 and 31 and turning off the bypass switches 23 and 33.

Then, the arm controller 120 transmits the normal operation control signal to the sub-module controller 130 (S125).

The sub-module controller 130 turns on the power switches 21 and 31 and turn off the bypass switches 23 and 33 in response to the normal operation control signal (S127). That is, the sub-module 10 is normally operated.

As described above, in the control device and control method for an MMC according to an embodiment of the present disclosure, since the arm controller 120 detects an arm current, it is possible to quickly sense generation of a DC failure overcurrent.

When a DC failure current is sensed, the arm controller 120 directly transmits a control signal for operation of the sub-module 10 to the sub-module controller 130 without waiting for a control signal from the main controller 110, so it is possible to quickly control the sub-module 10. Accordingly, the sub-module 10 is quickly protected from a DC failure current.

Further, according to an embodiment of the present disclosure, the main controller 110 can determine whether a DC failure is a temporal DC failure or a permanent failure, and when it is determined that a DC failure is a temporal DC failure and the normal state is returned, the sub-module 10 can be controlled to normally operate.

That is, when the sub-module 10 primarily quickly bypasses a DC failure current due to a DC failure and it is determined that the DC failure is a temporal DC failure, the sub-module 10 can changed into the normal state.

If it is determined that a DC failure is a permanent DC failure, it is possible to keep the sub-module 10 being protected from the DC failure current. Thereafter, it is possible to quickly take measures against the DC failure.

Meanwhile, in the related art, when the arm controller 120 senses a DC failure current, it notifies the main controller 120 of occurrence of a DC failure. Further, when a control signal is received from the main controller 120, a control signal for operation of the sub-module 10 is transmitted to the sub-module controller 130. Accordingly, operation of the sub-module 10 is controlled relatively late.

However, in the present disclosure, when the arm controller 120 determines a DC failure current, the arm controller 120 immediately quickly transmits a control signal for operation of the sub-module 10 to the sub-module controller 130 without waiting for a control signal from the main controller 110, whereby it is possible to quickly operate the sub-module 10 in comparison to the related art.

Further, since when a DC failure occurs, whether the DC failure is a temporal DC failure or a permanent DC failure is not determined in the related art, an arm current is kept bypassed by the sub-module 10 when it is a temporal DC failure and even after the normal state is returned, it is difficult to flexibly operate the MMC. However, in the present disclosure, when a DC failure is a temporal DC failure, the sub-module 10 is normally operated, so it is possible to flexibly operate the MMC.

Although embodiments of the present disclosure were described above with reference to the accompanying drawings, the present disclosure is not limited to the embodiments and may be achieved in various ways. Further, it would be understood by those skilled in the art that the present disclosure may be achieved in other ways without changing the spirit and necessary characteristics of the present disclosure. Accordingly, the embodiments described above should be understood as only examples without limiting the present disclosure in all respects.

The invention claimed is:

1. A control method for a Modular Multilevel Converter (MMC) composed of a plurality of sub-modules connected in series and including a converter arm connected to a DC link, the control method comprising:
    determining, by an arm controller, whether a DC failure occurs by detecting an arm current of the converter arm;
    transmitting by the arm controller, a bypass control signal to a sub-module controller and notifying a main controller of an occurrence of the DC failure when determining that the DC failure occurs;
    controlling, by the sub-module controller, the sub-module to bypass a DC failure current in response to the bypass control signal;
    detecting, by the main controller, in real time an arm current of the converter arm and a voltage of the DC link and determining whether the DC failure is a temporary DC failure or a permanent DC failure on the basis of the detected arm current and DC link voltage when the main controller is notified of the occurrence of the DC failure; and
    transmitting, by the main controller, a normal operation control signal for normal operation of the sub-module or a bypass control signal for bypassing of the DC failure current to the arm controller, depending on whether the DC failure is the temporary DC failure or the permanent DC failure,
    wherein the arm controller transmits the bypass control signal for turning off power switches and turning on a bypass switch to the sub-module controller without receiving a control signal from the main controller when determining the occurrence of the DC failure on the basis of the detected arm current, and then notifies the main controller of the occurrence of the DC failure,
    wherein the sub-module controller turns off the power switches in the sub-module and turns on the bypass switch in response to the bypass control signal received from the arm controller,
    wherein, after turning off the power switches and turning on the bypass switch, the main controller transmits the normal operation control signal for normally operating the sub-module to the arm controller when the DC failure is the temporary DC failure, and the sub-module controller turns on the power switches in the sub-module and turns off the bypass switch in response to the normal control signal received from the arm controller, and
    wherein the main controller transmits the bypass control signal for bypassing the DC failure current to the arm controller when the DC failure is the permanent DC failure, and the sub-module controller keeps the power switches, which have been turned off, turned off and keeps the bypass switch, which has been turned on, turned on in response to the bypass control signal.

2. The control method of claim 1, wherein the arm controller transmits the normal operation control signal to the sub-module controller and the sub-module controller controls the sub-module to normally operate in response to the normal operation control signal.

3. The control method of claim 1, wherein the arm controller transmits the bypass control signal to the sub-module controller and the sub-module controller controls the sub-module to bypass the DC failure current in response to the bypass control signal.

4. The control method of claim 1, wherein, in the controlling the sub-module, the sub-module controller turns off the power switches in the sub-module and turns on the bypass switch for bypassing the DC failure current.

5. A control device for a Modular Multilevel Converter (MMC) composed of a plurality of sub-modules connected in series and including a converter arm connected to a DC link, the control device comprising:
    an arm controller configured to determine whether a DC failure occurs by detecting an arm current of the converter arm, and configured to transmit a bypass control signal for protecting a sub-module and give notification of the DC failure when determining that the DC failure occurs;
    a sub-module controller configured to control the sub-module to bypass a DC failure current in response to the bypass control signal received from the arm controller; and
    a main controller configured to detect in real time an arm current of the converter arm and a voltage of the DC link, determine whether the DC failure is a temporary DC failure or a permanent DC failure on the basis of the detected arm current and the DC link voltage when being notified of an occurrence of the DC failure by the arm controller, and transmit a normal operation control signal for normally operating the sub-module or the bypass control signal for bypassing the DC failure current to the arm controller,
    wherein the arm controller transmits the bypass control signal for turning off power switches and turning on a bypass switch to the sub-module controller without receiving a control signal from the main controller when determining the occurrence of the DC failure on the basis of the detected arm current, and then notifies the main controller of the occurrence of the DC failure,
    wherein the sub-module controller turns off the power switches in the sub-module and turns on the bypass switch in response to the bypass control signal received from the arm controller,
    wherein, after turning off the power switches and turning on the bypass switch, the main controller transmits the normal operation control signal for normally operating the sub-module to the arm controller when the DC failure is the temporary DC failure, and the sub-module controller turns on the power switches, which have been turned off, and turns off the bypass switch, which has been turned on, in response to the normal control signal received from the arm controller, and
    wherein the main controller transmits the bypass control signal for bypassing the DC failure current to the arm controller when the DC failure is the permanent DC failure, and the sub-module controller keeps the power switches, which have been turned off, turned off and keeps the bypass switch, which has been turned on, turned on in response to the bypass control signal.

6. The control device of claim 5, wherein the sub-module includes:
  a half bridge or full bridge circuit including the power switches and a capacitor connected to the power switches in parallel; and
  the bypass switch connected between I/O terminals of the half bridge or full bridge circuit and configured to bypass a current.

7. The control device of claim 5, wherein the arm controller transmits the normal operation control signal to the sub-module controller and the sub-module controller controls the sub-module to normally operate in response to the normal operation control signal.

8. The control device of claim 5, wherein the arm controller transmits the bypass control signal to the sub-module controller and the sub-module controller controls the sub-module to bypass the DC failure current in response to the bypass control signal.

9. The control device of claim 5, wherein the arm controller determines that the DC failure occurs when the detected arm current is higher than a predetermined current.

* * * * *